ial

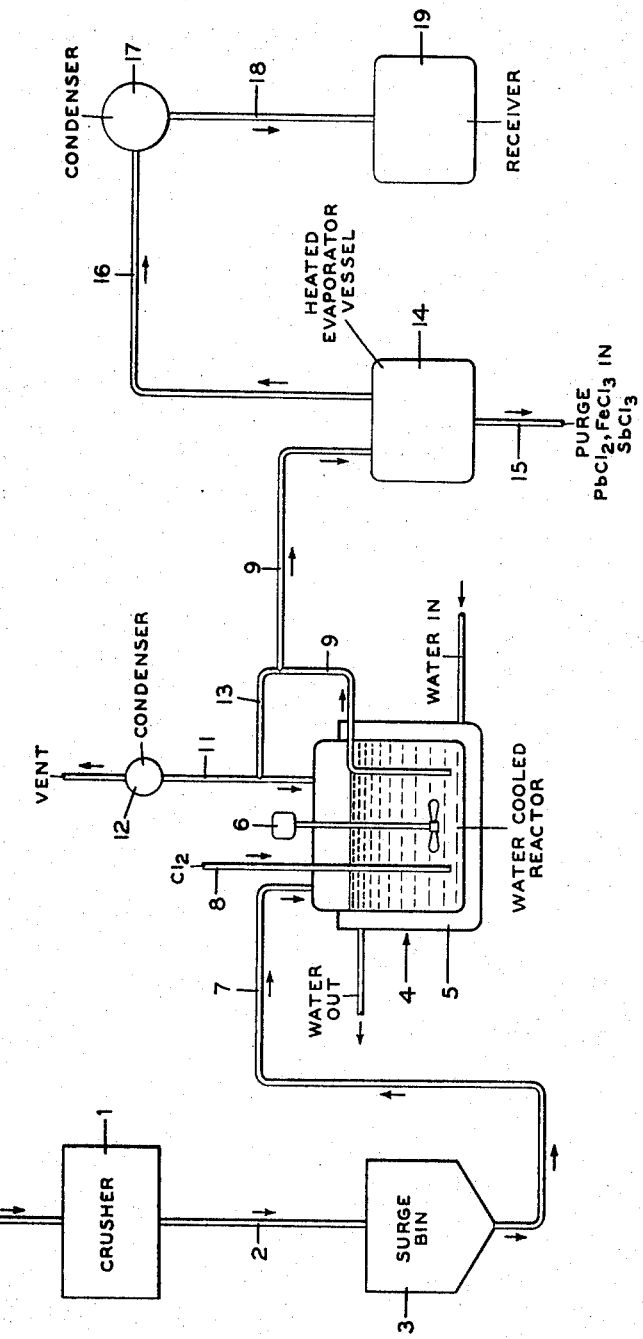

United States Patent Office 3,367,736
Patented Feb. 6, 1968

3,367,736
PROCESS FOR PRODUCTION OF
ANTIMONY TRICHLORIDE
Peter Sopchak, Clay, N.Y., assignor to Allied Chemical
Corporation, New York, N.Y., a corporation of New
York
Filed July 29, 1965, Ser. No. 475,756
4 Claims. (Cl. 23—98)

ABSTRACT OF THE DISCLOSURE

This specification discloses an improved process for the production of antimony trichloride whereby antimony metal is substantially all suspended by agitation in antimony trichloride at a concentration of 25–65 percent by weight at a temperature of 90–215° C., and passing chlorine gas into the suspension to react with the antimony. Antimony trichloride is removed from the reaction, and additional chlorine and antimony metal are added at rates to maintain the concentration of antimony as described above. This process is continuous and produces antimony trichloride essentially free of antimony pentachloride more economically than known processes.

---

Conventional preparation of antimony trichloride is by fixed bed reactor in which is disposed a stationary bed of antimony metal and chlorine gas is passed in contact with the antimony to produce antimony trichloride. Because of the relatively low thermal conductivity of antimony and its compounds along with the poor heat transfer characteristics of fixed bed systems, very high reaction interface temperatures develop which cause fusion and caking of the antimony bed. Frequent rodding is required to seal chlorine breakthrough channels in an effort to maintain product quality. Thus the difficulties in production of antimony trichloride by conventional methods are poor quality product or low capacity resulting from inherently inefficient operating conditions. Antimony trichloride of good quality contains a minimum of 99.0% $SbCl_3$ with premium quality containing more than 99.6% antimony trichloride and in addition should contain not more than a negligible amount of antimony pentachloride in an amount of less than 0.06%. One of the difficulties in the preparation of antimony trichloride from antimony metal is keeping down the antimony pentachloride impurities to a negligible amount.

An object of the present invention is to provide an efficient economical process for producing high quality antimony trichloride containing no more than a negligible amount of antimony pentachloride as an impurity. Another object of the present invention is to provide a continuous process for producing high purity antimony trichloride free of antimony pentachloride at high capacity with substantially quantitative yields. Other objects and advantages of the present invention will be apparent from the following description and accompanying drawing.

In accordance with the present invention antimony metal is converted to a product having an assay above 99.60% antimony trichloride with virtually no pentachloride present, at high throughput rates by maintaining a suspension of antimony metal particles in liquid antimony trichloride at a temperature of 90° to 215° C. preferably within the range of about 190–200° C., said suspension having a concentration of solid antimony particles in liquid antimony trichloride within the range of 25–65 weight percent preferably 50–60 weight percent solid antimony based on the total weight of the suspension, passing gaseous chlorine through said suspension of solid antimony in liquid antimony trichloride to effect conversion of the solid antimony to antimony trichloride, feeding solid antimony to said suspension, discharging liquid antimony trichloride from said suspension, and regulating the feed of antimony metal and the discharge of liquid antimony trichloride to maintain the concentration of solid antimony in said suspension within the range of 25–65% by weight preferably 50–60% by weight. It is most important that the temperature of the suspension be held below 215° C. preferably below about 200° C. For some unexpected reason the chlorination rate at or near about 220° C. was reduced approximately 6-fold with, of course, proportional reduction in capacity of the reactor and thus these higher temperatures should be avoided. Another important operating condition in the process of the present invention is the slurry concentration. At a slurry concentration in excess of 65 weight percent there is a loss of slurry fluidity and the operation is unsatisfactory. Slurry concentrations below 25 weight percent are undesirable because of loss in capacity. The optimum concentration is 55–60 weight percent of antimony metal suspended in liquid antimony trichloride.

The accompanying drawing diagrammatically illustrates the present invention.

Antimony metal of relatively high purity is commercially available generally in the form of cakes weighing about 50 or more pounds. Two typical analyses of commercial antimony metal are as follows:

|  | Grade A | RMM |
| --- | --- | --- |
| Percent Sb (by diff.) | 99.650 | 99.830 |
| Percent Pb | .270 | Trace |
| Percent As | .033 | .051 |
| Percent Fe | .020 | .072 |
| Percent Cu | .003 | .008 |
| Percent Sn | .006 |  |
| Percent Zn | Trace |  |
| Percent S | Trace | .024 |
| Percent Ni |  | .007 |

Relative to antimony trichloride, arsenic and sulfur chlorides are volatile constituents and, in the process of the present invention, can leave the system via vents separately or be combined with the product. Iron, lead and remaining trace metal chlorides, on the other hand, are high melting, nonvolatile impurities. Depending upon the use in which the antimony trichloride product may be employed, these impurities may be allowed to remain as contaminants in the product or provision for their elimination may be incorporated in the process as for example by intermittent purging.

Antimony cakes each weighing approximately 50 pounds and shaped like truncated pyramids with base dimensions of 10½" x 10½" and a height (truncated) of 3" entering crusher 1 are crushed therein from cake size to particle size passing a ⅛ inch screen. The size of the particles of antimony feed is not critical but should be of a size which can be readily maintained in suspension in the liquid antimony trichloride. Merely as illustrative crushed antimony having the following granulation was found satisfactory.

U.S. mesh:                               Percent retained
    8 ---------------------------------------- 0
   20 ---------------------------------------- 31
   60 ---------------------------------------- 34
 100 ---------------------------------------- 16
 Pan ---------------------------------------- 19

The crushed antimony metal is fed through line 2 into surge bin 3.

Start-up of the reaction system first involves removal of water vapor and oxygen from the process apparatus by purging with nitrogen. Reactor 4 equipped with jacket 5 and provided with agitator 6 is charged with commercial antimony trichloride flake which is melted (~73.4° C. M.P.) in situ using steam passing through jacket 5. After a melt temperature of 90–100° C. is achieved, agitation is started and crushed antimony metal added via line 7. Initial start-up charges of antimony and antimony trichloride are precalculated to develop the overflow operating volume with desired antimony concentration in the reactor. For example, to obtain 1000 ml. of 60 weight percent suspension at 200° C., total charge consists of 2290 grams of antimony and 1530 grams of antimony trichloride. During the charging period the temperature is maintained above 90° C. Upon completion of antimony addition, heating is discontinued and reaction (chlorine sparging) initiated. Reactor 4 temperature is allowed to increase as a result of reaction heat from approximately 90° until a desired level e.g. 200° C. is reached after which cooling water is introduced in jacket 5 for the reactor wall to maintain the specific temperature. The reaction may be illustrated by the following equation:

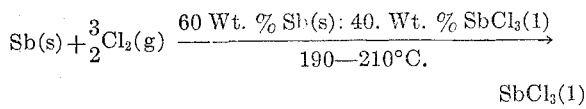

During normal operation chlorine feed is continuously introduced through line 8. Antimony is fed into the system through line 7 to maintain the concentration of antimony in suspension within the desired range of 25–65 weight percent preferably within the range of 50–60 weight percent. Antimony need not be fed continuously but may be fed intermittently to maintain the concentration within the prescribed range. Agitation should be sufficient to maintain all the antimony particles suspended and in a state of high activity. Complete uniformity of suspension is not necessary. In practice rotation of the agitator at 350–450 r.p.m. was found to give satisfactory results. Intense agitation while not affecting the reaction rate gives no beneficial result. Too low an agitator speed results in partial to complete settling of the antimony from the slurry thereby reducing available reaction surface which causes premature chlorine breakthrough. Continuous removal of liquid $SbCl_3$ essentially free of Sb, from the agitated reactor slurry is accomplished through takeoff tube 9. The liquid antimony trichloride may be caused to flow through inclined or elevated settling tube 9 by means of the density difference between reactor slurry and exiting $SbCl_3$. In this manner, any particles of antimony which may be carried with the liquid antimony trichloride will drop back by gravity to the body of suspension in reactor 4. To further prevent any possibility of antimony metal being entrained in the liquid antimony trichloride discharging from the reactor vessel, a low withdrawal velocity of the order of less than 0.5 feet/min. preferably less than 0.1 feet/min. may be employed. The reaction temperature rises due to the exothermic heat of reaction resulting from the formation of antimony trichloride. Control of the temperature is maintained by passing cool water through jacket 5.

Monitoring of product quality during regular operation may be carried out by melt point and visual (color) observation of samples. Color of acceptable product in the solid state is white. A yellow to brown discoloration, except for some other obvious source of contamination (iron, decomposed organic compounds), indicates presence of pentachloride which causes low melt points. Product with a melt point below 71° C. was also considered unacceptable. Melt point determination consisted of cooling liquid product in the Erlenmeyer flask equipped with a thermometer and recording temperature after partial solidification was observed (subcooling occurred before crystallization started).

Non-condensable gases including those such as arsenic and sulfur chlorides may be vented from the top of reactor 4 through line 11 and any antimony trichloride vapor which may be carried over is condensed in condenser 12 and drops back through line 11 to reactor 4. Line 13 connects lines 9 and 11.

The antimony trichloride overflowing from reactor 4 through line 9 enters evaporator vessel 14 equipped with a heating jacket, not shown in the drawing, for the purpose of vaporizing the antimony trichloride thereby effecting further purification of the product. Non-volatile impurities such as iron and lead chlorides would collect in evaporator 14 and could be discharged through line 15. If these minor amounts of impurity are not important to product quality then evaporator vessel 14 may be omitted. Vapors of antimony trichloride at a temperature of about 223° C. pass upwardly from evaporator 14 through line 16 thence through product condenser 17 wherein the vapors are cooled and liquefied and the liquid condensate then passed down through line 18 into receiver 19. If desired the liquid product may be transferred to a conventional flaking machine and the resultant antimony trichloride flaked product bagged for sale or liquid antimony trichloride may be discharged from receiver 19 for captive use in the plant.

The capacity of the plant for a given size unit is determined in large measure by the amount of antimony trichloride produced per unit volume of slurry in the reactor. When the antimony trichloride is operated in accordance with the present invention, rates in excess of 2.5 and approaching 3.0 pounds of antimony trichloride per hour per gallon of reactor slurry were achieved.

The following examples illustrate the present invention.

EXAMPLE 1

Commercial Grade A antimony cakes, each weighing approximately 50 pounds were manually hammered to 3 inches and under and this material was sent to a Braun Chipmunk Jaw Crusher (Model No. WD 64, 3 HP), and reduced to ¾ inch and under. The ¾ inch and under was fed to a 2 HP, BICO pulverizer (padded with nitrogen to prevent oxidation of the fine particles on the hot grinding surfaces) and was reduced to minus 8 plus 20 mesh.

The antimony metal feed analyzed as follows:

| | Percent |
|---|---|
| Sb (by diff.) | 99.83 |
| Pb | .1 |
| As | .021 |
| Fe | .024 |
| Cu | .013 |
| Zn | nil |
| Ni | .014 |

In a reactor having a working volume of 1,000 ml. (0.264 gallon) and equipped with a paddle type stirrer as illustrated in the drawing, was maintained a body of liquid antimony trichloride having suspended therein particles of antimony metal in which the antimony metal was 56 weight percent in the slurry of $SbCl_3$. The agitator was rotated at 450 r.p.m. and the reaction temperature maintained at 200° C. During the operation chlorine was introduced at the rate of 0.36 pound per hour. Chlorine was fed at the maximum rate to obtain a reactor capacity at the highest level without $Cl_2$ gas breakthrough, as evidenced by formation of yellow $SbCl_5$ vapors and discoloration of KI indicator paper in the reactor space. Antimony metal was fed into the reactor to maintain the concentration of antimony in the slurry at about 56%. Liquid antimony trichloride was withdrawn from the reactor at a rate to maintain a substantially constant volume. The reactor capacity (rate of production of antimony trichloride) in terms of pounds $SbCl_3$/hour/gallon was 2.92 and the product was of high purity as shown by the following analysis:

| | | |
|---|---|---|
| $SbCl_3$ | percent | 99.8 |
| $SbCl_5$ | do | nil |
| As | do | <.001 |
| Fe | p.p.m | 8 |
| Insol. in HCl | percent | [1] ND |
| Freezepoint | °C | 73.1 |
| Color | | White |

[1] Not detected

EXAMPLE 2

In a second comparable operation the temperature in the reactor was maintained at 140° C. and the agitator speed reduced to 350 r.p.m. The results were substantially the same i.e. a reactor capacity of 2.9 pounds $SbCl_3$ per hour per gallon was obtained and the antimony trichloride product was of high purity similar to that of Example 1.

EXAMPLE 3

A third operation conducted substantially as Example 1 except that a temperature of 210° C. in the reactor was maintained. The results were substantially the same as in Example 1.

EXAMPLE 4

For purposes of comparison an operation was conducted as in Example 1 except that a temperature of 220° C. was maintained in the reactor. To avoid chlorine gas breakthrough it was necessary to reduce the chlorine rate to 0.06 pound $Cl_2$ per hour. As a result the reactor capacity was quite low namely 0.49 pound $SbCl_3$/hour/gallon.

EXAMPLE 5

In another comparative operation similar to Example 1 the percent of antimony suspended in the antimony trichloride was increased to approaching 65% and the speed of the agitator was 350 r.p.m. As a result there was a reduction in the maximum chlorine rate to 0.26 pound/hour and a reduced reactor capacity of 2.11 pounds $SbCl_3$/hour/gallon.

Although certain preferred embodiments of the invention have been disclosed for purpose of illustration, it will be evident that various changes and modifications may be made therein without departing from the scope and spirit of the invention.

I claim:

1. A process for production of antimony trichloride which comprises maintaining a suspension of antimony metal particles in liquid antimony trichloride while agitating said suspension at a rate sufficient to maintain substantially all the antimony particles in suspension at a temperature within the range of 90° to 215° C., said suspension having a concentration within the range of 25–26 weight percent solid antimony based on the total weight of the suspension, passing gaseous chlorine through said suspension of antimony in liquid antimony trichloride to effect conversion of the solid antimony to antimony trichloride, feeding solid antimony to said suspension, discharging liquid antimony trichloride from said suspension, and regulating the feed of antimony metal and the discharge of liquid antimony trichloride to maintain the concentration of solid antimony in said suspension within the range of 25–65 percent by weight of the suspension.

2. A process for production of antimony trichloride which comprises maintaining a suspension of antimony metal particles in liquid antimony trichloride while agitating said suspension at a rate sufficient to maintain substantially all the antimony particles in suspension at a temperature of about 190–200° C., said suspension having a concentration within the range of 50–60 weight percent solid antimony based on the total weight of the suspension, passing gaseous chlorine through said suspension of antimony in liquid antimony trichloride to effect conversion of the solid antimony to antimony trichloride, feeding solid antimony to said suspension, discharging liquid antimony trichloride from said suspension, and regulating the feed of antimony metal and the discharge of liquid antimony trichloride to maintain the concentration of solid antimony in said suspension within the range of 50–60% by weight of the suspension.

3. A process as claimed in claim 1 wherein the liquid antimony trichloride discharged from the suspension is heated to convert the antimony trichloride to vapor, the antimony trichloride vapor separated from non-volatile impurities and the antimony trichloride vapor cooled, condensed and recovered as liquid or solid antimony trichloride.

4. A process as claimed in claim 1 wherein impurities more volatile than antimony trichloride are vented from the suspension of antimony metal in liquid antimony trichloride undergoing reaction.

References Cited

UNITED STATES PATENTS 1,384,918    7/1921    Ralston _____ 23—98

MILTON WEISSMAN, *Primary Examiner.*

OSCAR R. VERTIZ, EDWARD STERN, *Examiners.*